(12) United States Patent
Kobayashi (10) Patent No.: US 8,708,509 B2
(45) Date of Patent: Apr. 29, 2014

(54) STROBE DEVICE

(75) Inventor: Hiroaki Kobayashi, Kanagawa (JP)

(73) Assignee: Iriso Electronics Co., Ltd., Kanagawa (JP)

( * ) Notice: Subject to any disclaimer, the term of this patent is extended or adjusted under 35 U.S.C. 154(b) by 404 days.

(21) Appl. No.: 13/125,588

(22) PCT Filed: Jul. 6, 2009

(86) PCT No.: PCT/JP2009/062308
§ 371 (c)(1),
(2), (4) Date: Apr. 22, 2011

(87) PCT Pub. No.: WO2010/047156
PCT Pub. Date: Apr. 29, 2010

(65) Prior Publication Data
US 2011/0194291 A1    Aug. 11, 2011

(30) Foreign Application Priority Data
Oct. 23, 2008   (JP) .................. 2008-273197

(51) Int. Cl.
G03B 15/02   (2006.01)
G03B 15/06   (2006.01)

(52) U.S. Cl.
USPC .............. 362/16; 362/3; 362/10; 396/200

(58) Field of Classification Search
USPC ................. 362/3, 10, 16; 396/200
See application file for complete search history.

(56) References Cited

U.S. PATENT DOCUMENTS

| | | | |
|---|---|---|---|
| 5,913,083 A * | 6/1999 | Allen ...................... | 396/176 |
| 6,240,255 B1 * | 5/2001 | Yamaguchi ............... | 396/200 |
| 6,337,953 B1 * | 1/2002 | Nakanishi et al. ........ | 396/176 |
| 6,709,120 B2 * | 3/2004 | Lu et al. .................. | 362/16 |
| 8,052,292 B2 * | 11/2011 | Huang et al. ............ | 362/16 |
| 8,072,533 B2 * | 12/2011 | Wang et al. .............. | 348/371 |
| 2012/0212927 A1 * | 8/2012 | Liang et al. ............ | 362/16 |

FOREIGN PATENT DOCUMENTS

| | | |
|---|---|---|
| JP | 11-218807 | 8/1999 |
| JP | 2002-196401 | 7/2002 |
| JP | 2005-257808 | 9/2005 |

* cited by examiner

*Primary Examiner* — David J Makiya
(74) *Attorney, Agent, or Firm* — Lowe Hauptman & Ham, LLP (57) ABSTRACT

Each of electrode terminals is provided with an electrode connection section connected to an electrode of an electric discharge tube. When an exterior member is mounted on a housing, a concave section of the exterior member abuts on the electrode connection section of the electrode terminal, to displace the electrode connection section in a direction in which the electrode of the electric discharge tube is held therein. Thus, the exterior member is mounted on the housing so that connection between the electrode of the electric discharge tube and the electrode connection section can be completed. Therefore, connection work can be significantly easily performed without requiring soldering and press fitting.

7 Claims, 9 Drawing Sheets

STROBE DEVICE

RELATED APPLICATIONS

The present application is based on, and claims priority from, JP Application Number 2008-273197, filed Oct. 23, 2008, and PCT Application Number PCT/JP09/062308, filed Jul. 6, 2009, the contents of which are hereby incorporated by reference herein in their entireties.

TECHNICAL FIELD

The present invention relates to a strobe device, which is loaded into a digital camera, a video camera, or a camera-equipped mobile phone, for example.

BACKGROUND ART

Conventionally, known as this type of strobe device has been one including an electric discharge tube having electrodes, respectively, at both its ends in a longitudinal direction, a reflecting member for reflecting light from the electric discharge tube forward, and a trigger coil for applying a trigger voltage to the electric discharge tube and so adapted that the electric discharge tube emits light by applying a predetermined voltage between the electrodes of the electric discharge tube while applying the trigger voltage to the electric discharge tube via the reflecting member (see, e.g., Patent Literature 1).

CITATION LIST

Patent Literature

Patent Literature 1: Japanese Patent Publication 11-218807

SUMMARY OF INVENTION

Technical Problem

In the above-mentioned strobe device, an electric discharge tube is connected to a pair of electrode terminals by respectively soldering electrodes of the electric discharge tube to the electrode terminals. However, the electric discharge tube is soldered by hand work, resulting in inferior workability and reduced productivity. Alternatively, an electric discharge tube is connected to a pair of electrode terminals without soldering by press-fitting each of electrodes of the electric discharge tube between connection sections opposed to each other. In this case, a load at the time of press-fitting the electrode is applied to the electric discharge tube, so that the electric discharge tube may be damaged.

The present invention has been made in view of the above-mentioned problem, and is directed to providing a strobe device capable of easily connecting an electric discharge tube to an electrode terminal without requiring soldering and press fitting of the electric discharge tube.

Solution to Problem

In order to attain the above-mentioned object, in a strobe device including an electric discharge tube having electrodes, respectively, at both its ends in a longitudinal direction, a reflecting member for reflecting light from the electric discharge tube forward, and a pair of electrode terminals respectively connected to the electrodes of the electric discharge tube, each of the electrode terminals is provided with an electrode connection section connected to the electrode of the electric discharge tube, and the electrode connection section is displaceable in a direction in which the electrode of the electric discharge tube is held therein by contact with another component.

Thus, the electrode connection section of the electrode terminal is displaced in the direction in which the electrode of the electric discharge tube is held therein by contact with another component. When the electrode of the electric discharge tube is connected to the electrode terminal, therefore, soldering and press fitting are not required.

Advantageous Effects of Invention

According to the present invention, when an electrode of an electric discharge tube is connected to an electrode terminal, soldering and press fitting are not required. Therefore, connection work can be significantly easily performed.

DESCRIPTION OF EMBODIMENTS

FIGS. 1 to 11 illustrate an embodiment of the present invention.

The strobe device includes an electric discharge tube 1 for discharging and emitting light by applying a predetermined voltage, a reflecting member 2 for reflecting the light from the electric discharge tube 1 forward, a pair of electrode terminals 3 that are connected to the electric discharge tube 1, a housing 4 for housing the electric discharge tube 1, an exterior member 5 for covering the housing 4, a trigger coil 6 for outputting a trigger voltage to the electric discharge tube 1, a trigger input terminal 7 formed integrally with the reflecting member 2, and a holding member 8 for holding the housing 4 via each of the electrode terminals 3.

The electric discharge tube 1 is a well-known xenon tube having xenon gas sealed therein, and has a pair of electrodes 1a, respectively forming an anode and a cathode, provided at both its ends in a longitudinal direction.

The reflecting member 2 is formed by bending a conductive metal plate, and is arranged on the back side of the electric discharge tube 1. The reflecting member 2 includes a reflecting surface section 2a forming a concavely curved surface along an outer peripheral surface on the back side of the electric discharge tube 1. Elastically deformable contact pieces 2b, which contact the outer peripheral surface of the electric discharge tube 1, are provided at both ends of the reflecting surface section 2a. The reflecting member 2 has pairs of upper and lower engagement pieces 2c, which engage with the holding member 8, respectively provided at two points in a width direction on its back surface. Each of the engagement pieces 2c is provided with an engagement hole 2d. The reflecting member 2 has pairs of upper and lower fixed pieces 2e, which are fixed to the housing 4, respectively provided on both sides in the width direction.

Each of the electrode terminals 3 is composed of a conductive metal plate, and is fixed to the housing 4 at its one end and is fixed to the holding member 8 at the other end. The electrode terminal 3 includes a first fixed piece 3a that is fixed to the housing 4, and a second fixed piece 3b that is fixed to the holding member 8. An electrode connection section 3c, which is connected to each of the electrodes 1a of the electric discharge tube 1, is provided at a front end of the first fixed piece 3a. The electrode connection section 3c includes a pair of upper and lower portions formed in a forked shape, and the upper and lower portions are respectively curved upward and downward in an angular shape. A movable section 3d, which is elastically deformable in a back-and-forth direction, the width direction, and an up-and-down direction, is provided between the first fixed piece 3a and the second fixed piece 3b. The movable section 3d is curved in an S shape. A substrate connection section 3e, which is connected to a substrate (not illustrated), is provided at a lower end of the second fixed piece 3b.

The housing 4 is composed of a synthetic resin molding, and has a horizontally long opening 4a, which penetrates therethrough to its back surface, provided on its front surface. The opening 4a emits light from the electric discharge tube 1 forward, and has its inner surface and peripheral edge subjected to resin plating having light reflectivity. The housing 4 has projections 4b, which engage with the exterior member 5, respectively provided on both its side surfaces. The projections 4b extend in the back-and-forth direction. The housing 4 has grooves 4c, in which the first fixed pieces 3a of the electrode terminals 3 are press-fitted, respectively provided on both its sides. The groove 4c opens so that an upper end and the lower end of the electrode connection section 3c of the electrode terminal 3 respectively project outward from an upper surface and a lower surface of the projection 4b. The housing 4 has projections 4d, which engage with the exterior member 5, respectively provided at two points in the width direction on each of its upper and lower surfaces, and has a hole (not illustrated), in which each of the fixed pieces 2e of the reflecting member 2 is press-fitted, provided on the back surface.

The exterior member 5 is composed of a transparent synthetic resin molding, and opens on its back surface so that the housing 4 is inserted thereinto. The exterior member 5 has a lens section 5a provided on its front surface to slightly project forward. The lens section 5a is made horizontally long to correspond to the opening 4a of the housing 4. The exterior member 5 has holes 5b, which engage with the projections 4d of the housing 4, respectively provided at two points in the width direction on each of its upper and lower surfaces, and has notches 5c, which open at its trailing end, respectively provided on both its side surfaces. The exterior member 5 has concave sections 5d, which engage with the projections 4b of the housing 4, respectively provided on its inner side surface. The concave section 5d opens at the trailing end of the exterior member 5. In this case, the concave section 5d forms an abutment section, which abuts on the electrode connection section 3c of the electrode terminal 3 in an assembling process, described below.

The trigger coil 6 is a well-known coil for applying a high voltage to the outer peripheral surface, which contacts the reflecting member 2, of the electric discharge tube 1, and is attached to a back surface of the holding member 8. The trigger coil 6 includes a plate-shaped output terminal 6a extending forward, and a pair of input terminals 6b extending downward from its back surface. Each of the input terminals 6b is connected to a substrate (not illustrated). The trigger coil 6 has fixed pieces 6c, which are fixed to the holding member 8, respectively provided on both sides in the width direction. Each of the fixed pieces 6c extends forward.

The trigger input terminal 7 includes a terminal connection section 7a, which is connected to the output terminal 6a of the trigger coil 6, at its leading end. A movable section 7b, which is elastically deformable in the back-and-forth direction, the width direction, and the up-and-down direction, is provided between the terminal connection section 7a and the reflecting member 2. The movable section 7b is curved in an S shape, and extends forward to the reflecting member 2 after passing under the terminal connection section 7a from a trailing end of the terminal connection section 7a.

The holding member 8 is composed of a synthetic resin molding, and has grooves 8a, in which the second fixed pieces 3b of the electrode terminals 3 are respectively press-fitted, and vertically long holes 8b, in which the movable sections 3d of the electrode terminals 3 are respectively arranged, provided to communicate with each other on both sides in the width direction. The holding member 8 has a horizontally long hole 8c, in which the movable section 7b of the trigger input terminal 7 is arranged, provided on the side of its upper end. Grooves 8d, in which the terminal connection section 7a of the trigger input terminal 7 is press-fitted, are respectively provided on both sides in the width direction of the hole 8c. The holding member 8 has a projection 8e projecting forward provided on its front surface. Projections 8f, which respectively engage with the engagement holes 2d of the reflecting member 2, are provided at two points in the width direction on each of an upper surface and the lower surface of the projection 8e. The holding member 8 has a hole 8g, in which the output terminal 6a of the trigger coil 6 is inserted, provided on its back surface. The hole 8g communicates with the hole 8c for the movable section 7b. The holding member 8 has a concave section 8h, in which the trigger coil 6 is arranged, provided on its back surface. Holes 8i, in which the fixed pieces 6c of the trigger coil 6 are respectively press-fitted, are provided on both sides in the width direction of the concave section 8h.

Figure 1:
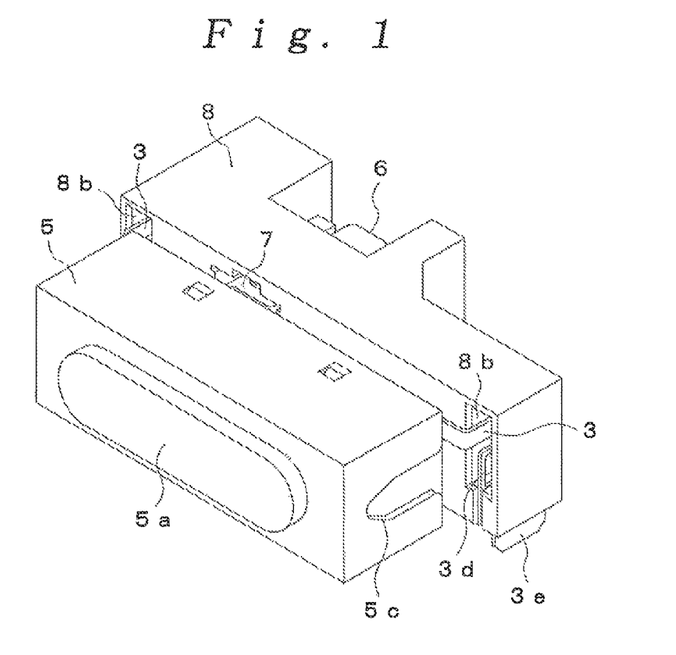
FIG. 1 is a perspective view on the front side of a strobe device according to an embodiment of the present invention.
Figure 2:
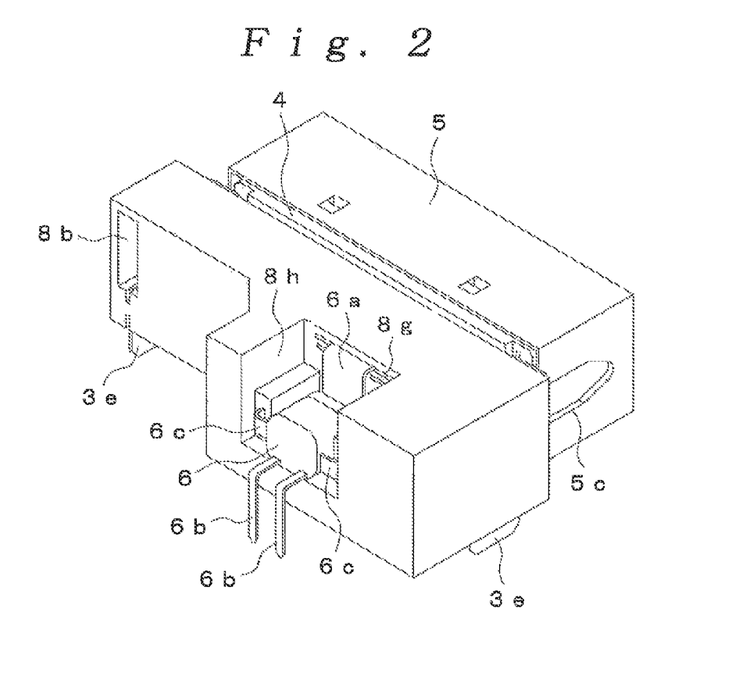
FIG. 2 is a perspective view on the back side of the strobe device.
Figure 3:
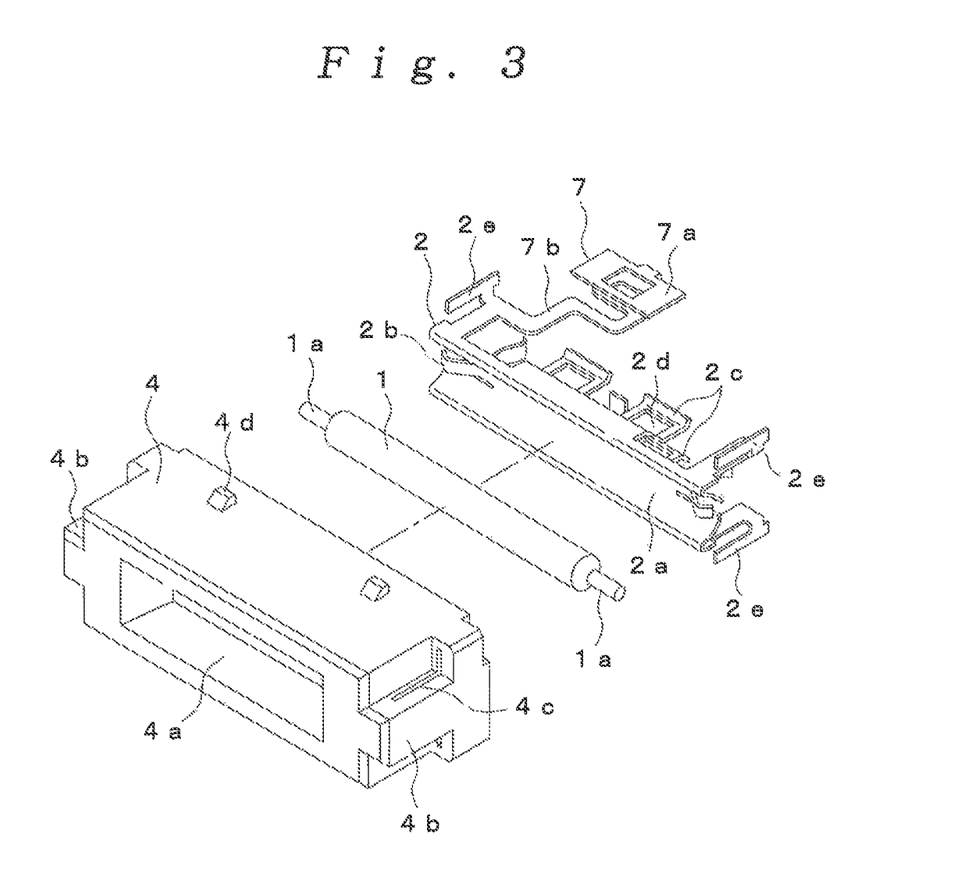
FIG. 3 is an exploded perspective view illustrating a part of the strobe device.
Figure 4:
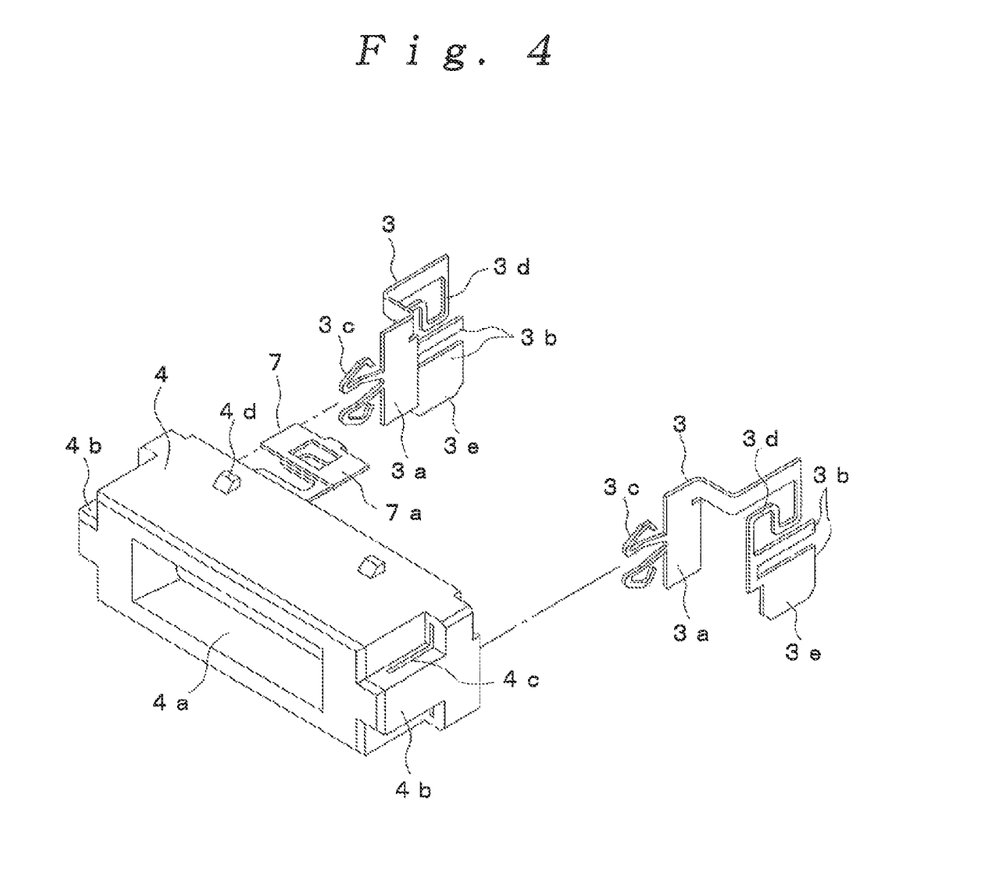
FIG. 4 is an exploded perspective view illustrating a part of the strobe device.

When the strobe device having the above-mentioned configuration is assembled, the electric discharge tube 1 is first arranged ahead of the reflecting member 2, as illustrated in FIG. 3. Each of the fixed pieces 2e of the reflecting member 2 is press-fitted into a hole (not illustrated) on the back surface of the housing 4 from behind, to fix the reflecting member 2 to the housing 4. In the case, each of the contact pieces 2b of the reflecting member 2 press-contacts the outer peripheral surface of the electric discharge tube 1. The first fixed pieces 3a of the electrode terminals 3 are respectively press-fitted into the grooves 4c of the housing 4 from behind, as illustrated in FIG. 4, to fix the electrode terminals 3 to the housing 4. In the case, the electrode 1a of the electric discharge tube 1 is arranged between the upper and lower portions of the electrode connection section 3c.

Figure 5:
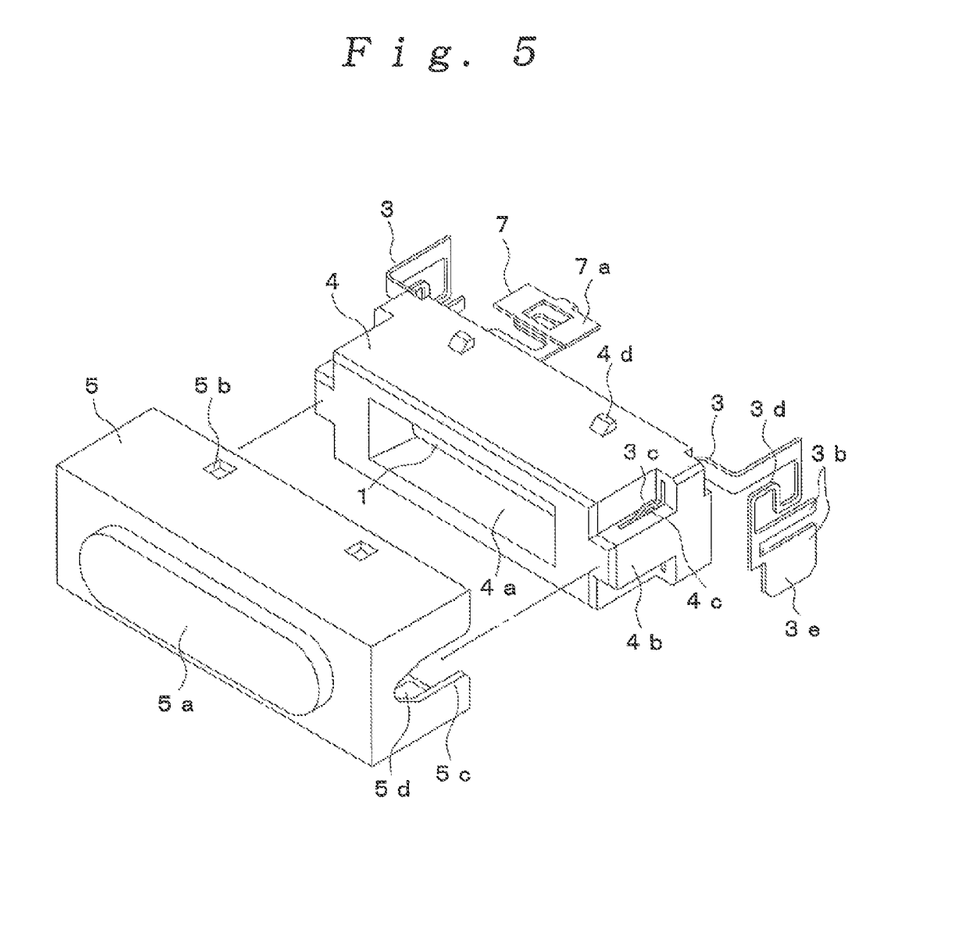
FIG. 5 is an exploded perspective view illustrating a part of the strobe device.
Figure 6:
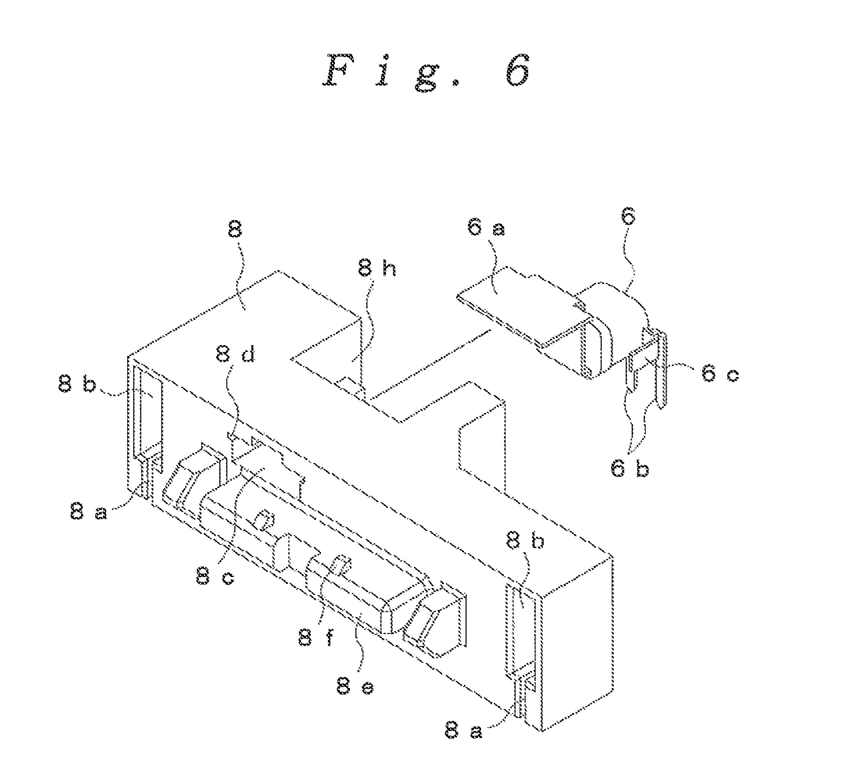
FIG. 6 is an exploded perspective view illustrating a part of the strobe device.
Figure 7:
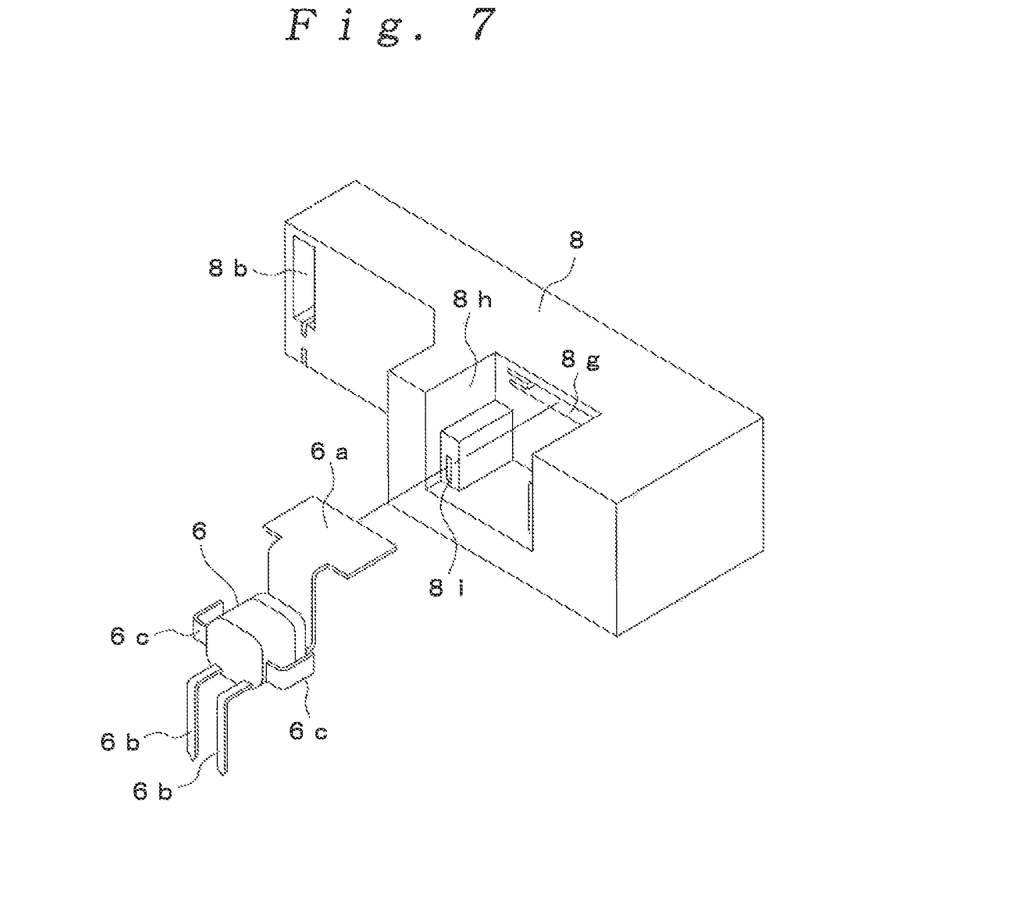
FIG. 7 is an exploded perspective view illustrating a part of the strobe device.
Figure 9A:
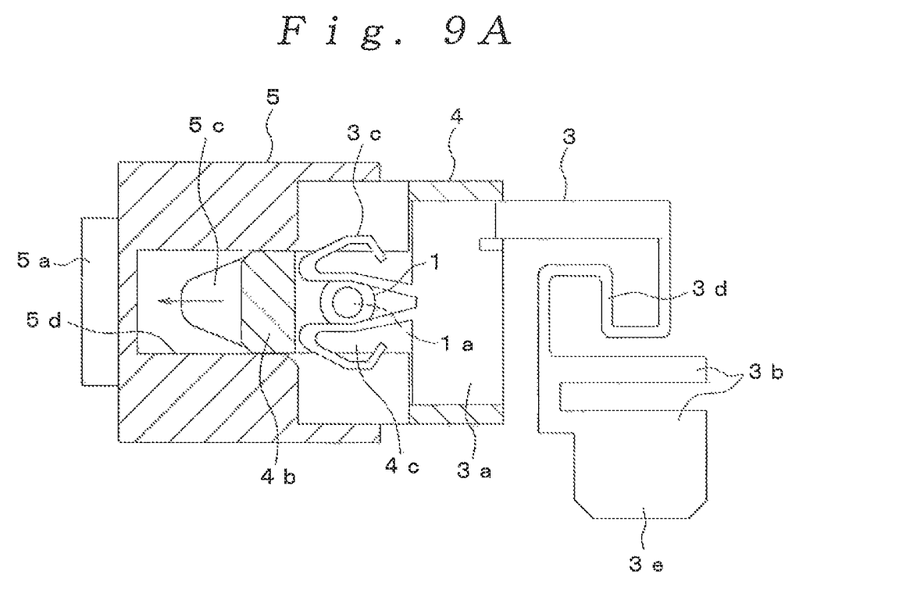
FIGS. 9A and 9B are side sectional views illustrating a process of connecting an electric discharge tube to terminals.
Figure 9B:
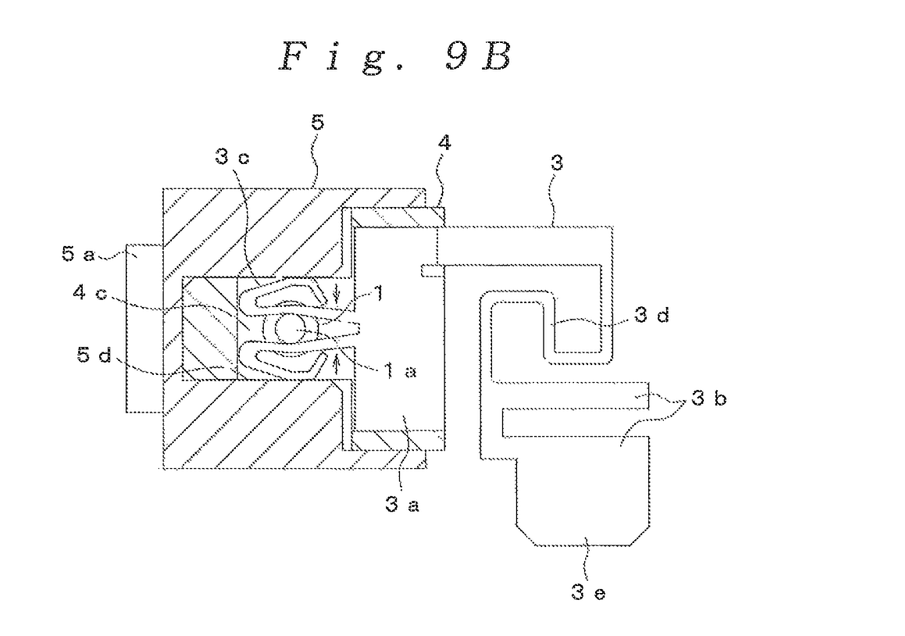

The housing 4 is then inserted into the exterior member 5 from behind, as illustrated in FIG. 5, so that the concave sections 5d of the exterior member 5 respectively engage with the projections 4b of the housing 4. In the case, the upper end and the lower end of the electrode connection section 3c of the electrode terminal 3 respectively project upward and downward from the grooves 4c on the upper surface and the lower surface of the projection 4b, as illustrated in FIG. 9A. When the projection 4b is inserted into the concave section 5e, therefore, an upper surface and a lower surface of the inside of the concave section 5e respectively abut on the upper end and the lower end of the electrode connection section 3c, as illustrated in FIG. 9B, so that the electrode connection section 3c is pressed into the projection 4b. Thus, the upper and lower portions of the electrode connection section 3c press-contact the electrode 1a of the electric discharge tube 1 so that the electrode 1a of the electric discharge tube 1 is held in the electrode connection section 3c. When the exterior member 5 is mounted on the housing 4, as described above, the projections 4d of the housing 4 are respectively fitted into the holes 5b of the exterior member 5 so that the exterior member 5 is fixed to the housing 4. Then, the output terminal 6a of the trigger coil 6 is then inserted into the hole 8g of the holding member 8 while the fixed pieces 6c of the trigger coil 6 are respectively press-fitted into the holes 8i of the holding member 8, as illustrated in FIGS. 6 and 7, to fix the trigger coil 6 to the concave section 8h on the back surface of the holding member 8.

Figure 8:
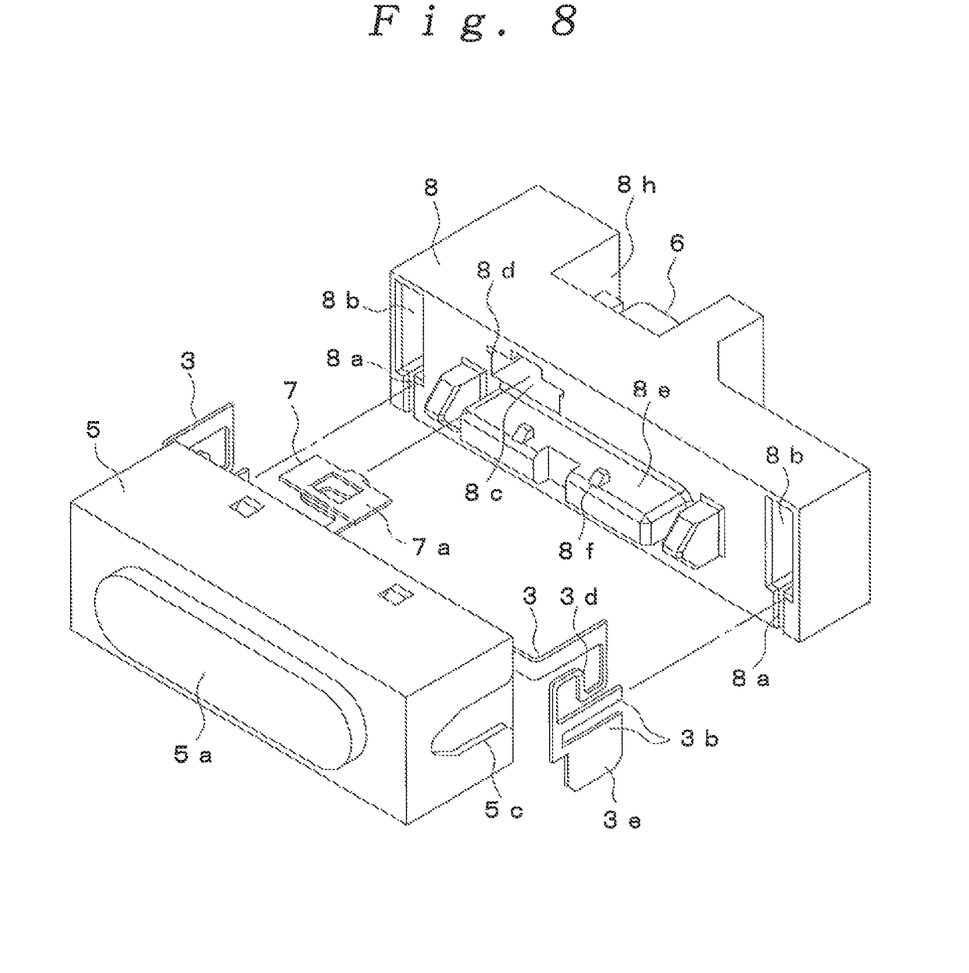
FIG. 8 is an exploded perspective view of the strobe device.
Figure 10:
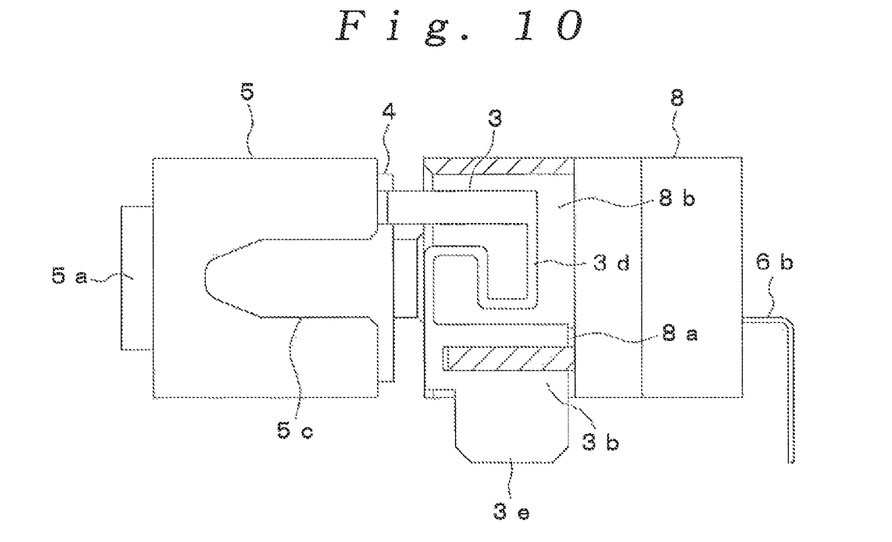
FIG. 10 is a side view, partially in section, of the strobe device.
Figure 11:
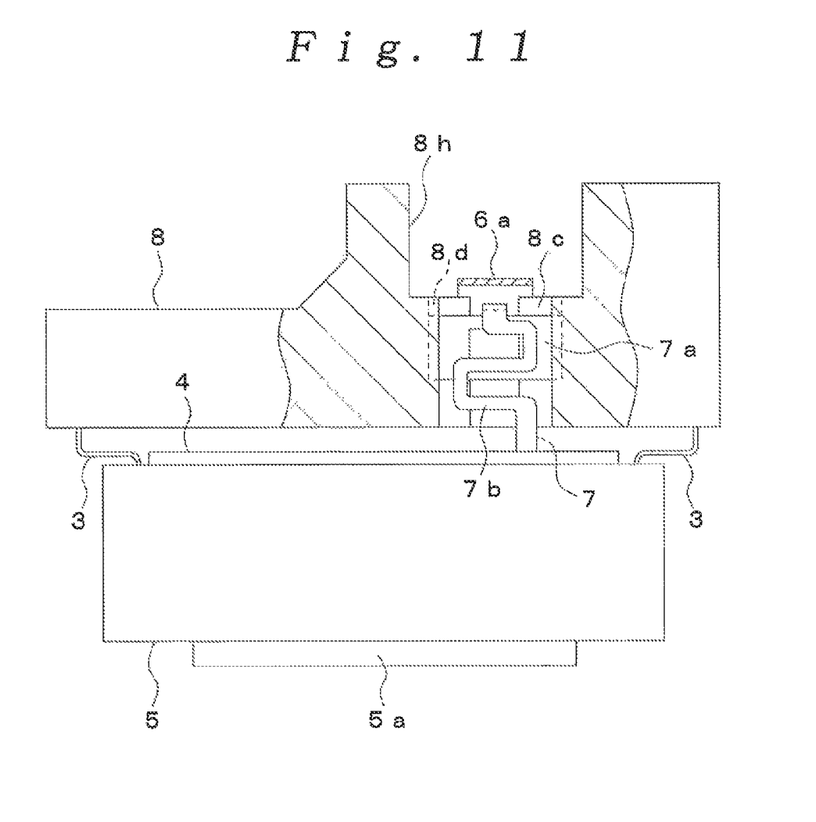
FIG. 11 is a bottom view, partially in section, of the strobe device.

The second fixed pieces 3b of the electrode terminals 3 are respectively press-fitted into the grooves 8a of the holding member 8 while the terminal connection section 7a of the trigger input terminal 7 is press-fitted into the grooves 8d of the holding member 8, as illustrated in FIG. 8, to fix the electrode terminals 3 and the trigger input terminal 7 to the holding member 8. Thus, the housing 4 is held in the holding member 8 via each of the electrode terminals 3 and the trigger input terminal 7 while the terminal connection section 7a of the trigger input terminal 7 is connected to the output terminal 6a of the trigger coil 6. In the case, the movable section 3d of the electrode terminal 3 and the movable section 7b of the trigger input terminal 7 are respectively arranged in the holes 8b and 8c of the holding member 8 so as to be displaceable in the back-and-forth direction, the width direction, and the up-and-down direction, as illustrated in FIGS. 10 and 11, so that the housing 4 is held in the holding member 8 movably in the same directions.

In the strobe device according to the present embodiment, each of the electrode terminals 3 is thus provided with the electrode connection section 3c, which is connected to the electrode 1a of the electric discharge tube 1, and the electrode connection section 3c is displaced in a direction in which the electrode 1a of the electric discharge tube 1 is held therein by contact with another component. When the electrode 1a of the electric discharge tube 1 is connected to each of the electrode terminals 3, therefore, connection work can be significantly easily performed without requiring soldering and press fitting.

In this case, when the exterior member 5 is mounted on the housing 4, the concave section 5e of the exterior member 5 abuts on the electrode connection section 3c of each of the electrode terminals 3 so that the electrode connection section 3c is displaced in the direction in which the electrode 1a of the electric discharge tube 1 is held therein. Therefore, the exterior member 5 is mounted on the housing 4 so that connection between the electrode 1a of the electric discharge tube 1 and the electrode connection section 3c can be completed. Therefore, connection work can be performed more easily and reliably.

The strobe device includes the holding member 8 for holding the housing 4 via the electrode terminals 3. The movable section 3d, which is elastically deformable, provided between the one end and the other end of each of the electrode terminals 3, holds the housing 4 movably in the back-and-forth direction, the width direction, and the up-and-down direction relative to the holding member 8. Accordingly, when the housing 4 is assembled to a camera main body or a substrate, for example, a shift in position between the housing 4 and the holding member 8 can be absorbed. Therefore, assembling work can be easily performed.

Furthermore, the trigger coil 6 is attached to the holding member 8 while the terminal connection section 7a provided at the leading end of the trigger input terminal 7 extending from the reflecting member 2 toward the holding member 8 is connected to the trigger coil 6, and the movable section 7b, which is elastically deformable in the back-and-forth direction, the width direction, and the up-and-down direction, is provided between the terminal connection section 7a of the trigger input terminal 7 and the reflecting member 2. Therefore, the shift in position between the housing 4 and the holding member 8 can be absorbed in the same manner as described above.

In this case, the trigger input terminal 7 is formed integrally with the reflecting member 2. Therefore, the number of components can be reduced while conduction failure between the trigger input terminal 7 and the reflecting member 2 can be reliably prevented.

REFERENCE SIGNS LIST

1 . . . electric discharge tube, 1a . . . electrode, 2 . . . reflecting member, 3 . . . electrode terminal, 3c . . . electrode connection section, 3d . . . movable section, 4 . . . housing, 5 . . . exterior member, 5e . . . concave section, 6 . . . trigger coil, 7 . . . trigger input terminal, 7b . . . movable section, and 8 . . . holding member.

The invention claimed is:

1. A strobe device comprising:
an electric discharge tube having electrodes, respectively, at both its ends in a longitudinal direction,
a reflecting member for reflecting light from the electric discharge tube forward,
a pair of electrode terminals respectively connected to the electrodes of the electric discharge tube, wherein each of the electrode terminals is provided with an electrode connection section connected to the electrode of the electric discharge tube, and the electrode connection section is displaceable in a direction in which the electrode of the electric discharge tube is held therein by contact with another component;
a housing to which one end of each of the electrode terminals is fixed and in which the electric discharge tube and the electrode connection section of the electrode terminal are arranged; and
a holding member, to which the other end of each of the electrode terminals is fixed, for holding the housing via the electrode terminal, and a movable section, which is elastically deformable in a predetermined direction, provided in the holding member between the one end and the other end of the electrode terminal.

2. The strobe device according to claim 1, further comprising:
an exterior member mounted on the housing, and an abutment section provided in the exterior member abuts on the electrode connection section of the electrode terminal, to displace the electrode connection section in the direction in which the electrode of the electric discharge tube is held therein when the exterior member is mounted on the housing.

3. The strobe device according to claim 1, further comprising:
a trigger coil, attached to the holding member, for applying a trigger voltage to the electric discharge tube, and
a trigger input terminal having its leading end connected to the trigger coil attached to the holding member and extending from the reflecting member that contacts the electric discharge tube toward the holding member, and a movable section, which is elastically deformable in a predetermined direction, provided in the holding member between the leading end of the trigger input terminal and the reflecting member.

4. The strobe device according to claim 3, wherein the trigger input terminal is formed integrally with the reflecting member.

5. A strobe device comprising:
an electric discharge tube having electrodes, respectively, at both its ends in a longitudinal direction,
a reflecting member for reflecting light from the electric discharge tube forward,
a pair of electrode terminals respectively connected to the electrodes of the electric discharge tube, wherein each of the electrode terminals is provided with an electrode connection section connected to the electrode of the electric discharge tube, and the electrode connection section is displaceable in a direction in which the electrode of the electric discharge tube is held therein by contact with another component,
a housing to which one end of each of the electrode terminals is fixed and in which the electric discharge tube and the electrode connection section of the electrode terminal are arranged,
an exterior member mounted on the housing, and an abutment section provided in the exterior member abuts on the electrode connection section of the electrode terminal, to displace the electrode connection section in the direction in which the electrode of the electric discharge tube is held therein when the exterior member is mounted on the housing, and
a holding member, to which the other end of each of the electrode terminals is fixed, for holding the housing via the electrode terminal, and a movable section, which is elastically deformable in a predetermined direction, provided in the holding member between the one end and the other end of the electrode terminal.

6. The strobe device according to claim 5, further comprising:
a trigger coil, attached to the holding member, for applying a trigger voltage to the electric discharge tube, and
a trigger input terminal having its leading end connected to the trigger coil attached to the holding member and extending from the reflecting member that contacts the electric discharge tube toward the holding member, and a movable section, which is elastically deformable in a predetermined direction, provided in the holding member between the leading end of the trigger input terminal and the reflecting member.

7. The strobe device according to claim 6, wherein the trigger input terminal is formed integrally with the reflecting member.

* * * * *